(12) United States Patent
Engelmann

(10) Patent No.: US 6,675,110 B2
(45) Date of Patent: Jan. 6, 2004

(54) TESTING VALVE ASSEMBLIES

(75) Inventor: Lester Engelmann, Woodland, CA (US)

(73) Assignee: Watts RegulatoryCo., North Andover, MA (US)

(*) Notice: Subject to any disclaimer, the term of this patent is extended or adjusted under 35 U.S.C. 154(b) by 11 days.

(21) Appl. No.: 10/046,111

(22) Filed: Jan. 15, 2002

(65) Prior Publication Data

US 2003/0135334 A1 Jul. 17, 2003

(51) Int. Cl.$^7$ .................. G01M 19/00; G01L 15/00; G01F 1/26
(52) U.S. Cl. .................. 702/45; 73/168; 73/597; 137/115.05; 137/112; 169/16; 169/23; 702/39; 702/51; 702/83; 702/138
(58) Field of Search .................. 702/33, 45, 50, 702/100, 114, 138; 73/1.72, 168, 197, 861; 137/14, 38, 102, 115.05, 218, 512, 514, 554, 557; 169/5, 14, 16, 20, 23, 43

(56) References Cited

U.S. PATENT DOCUMENTS

| | | | |
|---|---|---|---|
| 857,321 A | 6/1907 | Waltz | 340/289 |
| 988,768 A | 4/1911 | Goldstein | 137/243.5 |
| 1,026,439 A | 5/1912 | Hamilton | 169/23 |
| 1,125,407 A | 1/1915 | Shipman | 169/23 |
| 1,414,723 A | 5/1922 | Brumbaugh | 169/23 |
| 1,428,645 A | 9/1922 | McDonnell | 200/81.9 R |
| 1,869,202 A | 7/1932 | Lowe et al. | 169/17 |
| 1,950,029 A | 3/1934 | Hamilton et al. | 169/17 |
| 1,958,143 A | 5/1934 | Howard | 169/23 |
| 2,017,841 A | 10/1935 | Coleman | 137/561 R |
| 2,505,761 A | 5/1950 | Gieseler | 169/16 |
| 2,558,175 A | 6/1951 | Gieseler | 169/5 |
| 2,646,064 A | 7/1953 | Colton | 137/218 |
| 3,462,994 A | 8/1969 | Maust | 137/557 |
| 3,529,625 A | 9/1970 | Ferrari | 137/554 |
| 3,837,357 A | 9/1974 | Slaughter, Jr. | 137/554 |
| 3,837,358 A | 9/1974 | Zieg et al. | 137/614.2 |
| 3,888,314 A | 6/1975 | Landsberg | 169/20 |
| 3,942,551 A | 3/1976 | Schuller et al. | 137/514 |
| 3,958,643 A | 5/1976 | Landsberg | 169/43 |
| 4,033,706 A * | 7/1977 | Schaefer et al. | 417/79 |
| 4,287,905 A | 9/1981 | Iglesias | 137/102 |
| 4,337,655 A | 7/1982 | Sundstrom et al. | 73/861.03 |
| 4,361,189 A | 11/1982 | Adams | 169/14 |

(List continued on next page.)

FOREIGN PATENT DOCUMENTS

| | | |
|---|---|---|
| DE | 35 27 849 | 2/1987 |
| GB | 321085 | 10/1929 |
| GB | 999071 | 7/1965 |

OTHER PUBLICATIONS

"Testing Procedures for Backflow Preventers," Chapter 5, pp. 25–29, 1973.
Brochure from Watts Industries, Inc., "Series 1000 WBG Backflow Valve Testing and Monitoring Device," 2 pages, 1998.

*Primary Examiner*—John Barlow
*Assistant Examiner*—John Le
(74) *Attorney, Agent, or Firm*—Fish & Richardson P.C.

(57) ABSTRACT

A method of determining flow through a valve includes determining a first differential pressure across the valve. The valve is bypassed and a second differential pressure is determined across the valve. A flow decision is determined for the valve based on comparison of the first and second differential pressures. A method of testing a relief valve in a reduced pressure backflow preventer assembly includes determining a first differential pressure across an upstream check valve during a no flow condition. The upstream check valve is bypassed for the purpose of opening a relief valve, and a zone vent is opened.

38 Claims, 11 Drawing Sheets

U.S. PATENT DOCUMENTS

| | | | |
|---|---|---|---|
| 4,489,746 A | 12/1984 | Daghe et al. | 137/218 |
| 4,518,006 A | 5/1985 | Hoffmann et al. | 137/218 |
| 4,624,279 A | 11/1986 | Arens et al. | 137/218 |
| 4,805,665 A | 2/1989 | League | 137/554 |
| 4,921,006 A | 5/1990 | Evans | 137/554 |
| 4,971,094 A | 11/1990 | Gonzalez | 137/38 |
| 4,991,655 A | 2/1991 | McHugh | 169/16 |
| 5,031,661 A | 7/1991 | Feuz | 137/614.2 |
| 5,085,076 A | 2/1992 | Engelmann | 73/197 |
| 5,154,232 A | 10/1992 | McHugh | 169/23 |
| 5,257,208 A | 10/1993 | Brown et al. | 702/138 |
| 5,297,635 A | 3/1994 | McHugh | 169/23 |
| 5,390,744 A | 2/1995 | McHugh | 169/23 |
| 5,404,905 A | 4/1995 | Lauria | 137/557 |
| 5,425,393 A | 6/1995 | Everett | 137/218 |
| 5,462,082 A | 10/1995 | Lauria | 137/557 |
| 5,531,094 A | 7/1996 | More et al. | 73/1.72 |
| 5,566,704 A | 10/1996 | Ackroyd et al. | 137/14 |
| 5,713,240 A | 2/1998 | Engelmann | 73/168 |
| 5,813,226 A * | 9/1998 | Krone et al. | 60/327 |
| 5,957,153 A * | 9/1999 | Frey et al. | 137/240 |
| 2002/0020444 A1 | 2/2002 | Dickerson, Jr. et al. | 137/112 |

* cited by examiner

TESTING VALVE ASSEMBLIES

TECHNICAL FIELD

This invention relates to testing valve assemblies, and more particularly to detecting flow in a backflow preventer assembly.

BACKGROUND

Backflow preventer assemblies are typically used to restrict backflow into a water supply line. After installation, the assembly is tested for proper operation. The tests are typically performed manually at times when there is access to the assembly and the ability to turn off the water supply.

SUMMARY

According to the invention, a method of determining flow through a valve includes determining a first differential pressure across the valve. The valve is then bypassed and a second differential pressure is determined across the valve. A flow decision is determined for the valve based on comparison of the first and second differential pressures.

Embodiments of this aspect of the invention may include one or more of the following features. The method includes determining whether flow is forward, backward, or no flow. If the first differential pressure is within a predetermined positive range and the second differential pressure is substantially unchanged from the first differential pressure, the flow decision is forward flow. If the first differential pressure is substantially non-zero and the second differential pressure is substantially zero, the flow decision is no flow. If the first differential pressure is within a predetermined negative range and the second differential pressure is substantially unchanged from the first differential pressure, the flow decision is backward flow.

The method is performed in an automated fashion from a remote location. The flow decision is determined without input from a flow meter. The first and second differential pressures are determined to within a range, e.g., values greater than a predetermined positive threshold.

The method includes collecting additional data and basing the determined flow decision on the additional collected data as well as on comparison of the first and second differential pressures. Collecting additional data includes determining a first differential pressure for a second valve, bypassing the second valve, and determining a second differential for the second valve. Additional data is collected after the flow decision is determined. If the flow decision is no flow, collecting additional data includes performing a relief valve actuation test. Performing the relief valve actuation test includes opening a vent in a zone of a reduced pressure backflow preventer assembly. The zone includes a relief valve.

A pass/fail decision is determined for the valve based on a comparison of at least one of the two differential pressures to a predetermined value. The method includes stopping the bypassing, and determining the second differential pressure after the bypassing is stopped. The method is performed repeatedly. The method is performed for a check valve in a backflow preventer assembly. The method is performed for a first and a second check valve in a reduced pressure backflow preventer assembly, and the method determines whether a relief valve is discharging based on the first and second differential pressures across each of the two check valves.

Determining the flow decision for the valve includes determining whether there is a backflow through the valve. A differential pressure is determined across a downstream valve prior to determining the first differential pressure across the upstream valve, and a backflow decision is determined for the downstream valve. The backflow decision for the downstream valve is determined prior to any explicit determination of whether there is a backflow through the upstream valve and, thus, implicitly determines whether there is a backflow through the upstream valve.

According to another aspect of the invention, a computer program for determining flow through a valve resides on a computer-readable medium. The computer program includes instructions for causing a computer to determine a first differential pressure across the valve, to bypass the valve, to determine a second differential pressure across the valve, and to determine a flow decision for the valve based on comparison of the first and second differential pressures.

According to another aspect of the invention, an apparatus for determining flow through a valve within a housing, the valve defining an upstream side and a downstream side, includes one or more pressure indicators coupled to the downstream side and the upstream side of the valve, and a bypass coupled to the upstream side and to the downstream side of the valve. The apparatus further includes a programmable device coupled to the one or more pressure indicators and to the bypass. The programmable device is programmed to determine a first differential pressure across the valve, to bypass the valve, to determine a second differential pressure across the valve, and to determine a flow decision for the valve based on comparison of the first and second differential pressures.

According to another aspect of the invention, an apparatus for determining flow through a valve includes means for determining a first differential pressure across the valve, means for bypassing the valve after determining the first differential pressure, means for determining, after bypassing the valve, a second differential pressure across the valve, and means for producing a flow decision for the valve based on comparison of the first and second differential pressures.

According to another aspect of the invention, a method of testing a relief valve in a reduced pressure backflow preventer assembly including an upstream check valve, a downstream check valve, and a relief valve includes determining during a no flow condition a first differential pressure across the upstream check valve, bypassing the upstream check valve after determining the first differential pressure, thereby allowing flow between an upstream side of the valve assembly and a zone between the valves to open the relief valve, and opening a vent to reduce pressure in the zone. The relief valve and the vent are coupled to the zone.

Embodiments of this aspect of the invention may include one or more of the following features. The method is performed in an automated fashion from a remote location. The method includes determining that there is a no flow condition through the upstream check valve, closing the vent, and determining a second differential pressure across the upstream check valve. The relief valve includes the vent and is opened by a control signal.

According to another aspect of the invention, a method of determining flow through a valve includes determining a first differential pressure and a second differential pressure across the valve. A flow decision is determined for the valve based on comparison of the first and second differential pressures.

At least one method and apparatus described can be used, for example, to remotely test a valve, including testing for a no flow condition, a backflow condition, and a forward flow condition. These tests can be performed using hydraulic information such as pressure and without the use of a flow meter or other flow-sensing device.

The details of one or more implementations are set forth in the accompanying drawings and the description below. Other features and implementations will be apparent from the description and the drawings, and from the claims.

Reference symbols differing only in an appended letter, for example, reference symbols 140 (FIG. 1), 140a (FIG. 2), and 140b (FIG. 3), indicate analogous elements.

DETAILED DESCRIPTION

Figure 1:
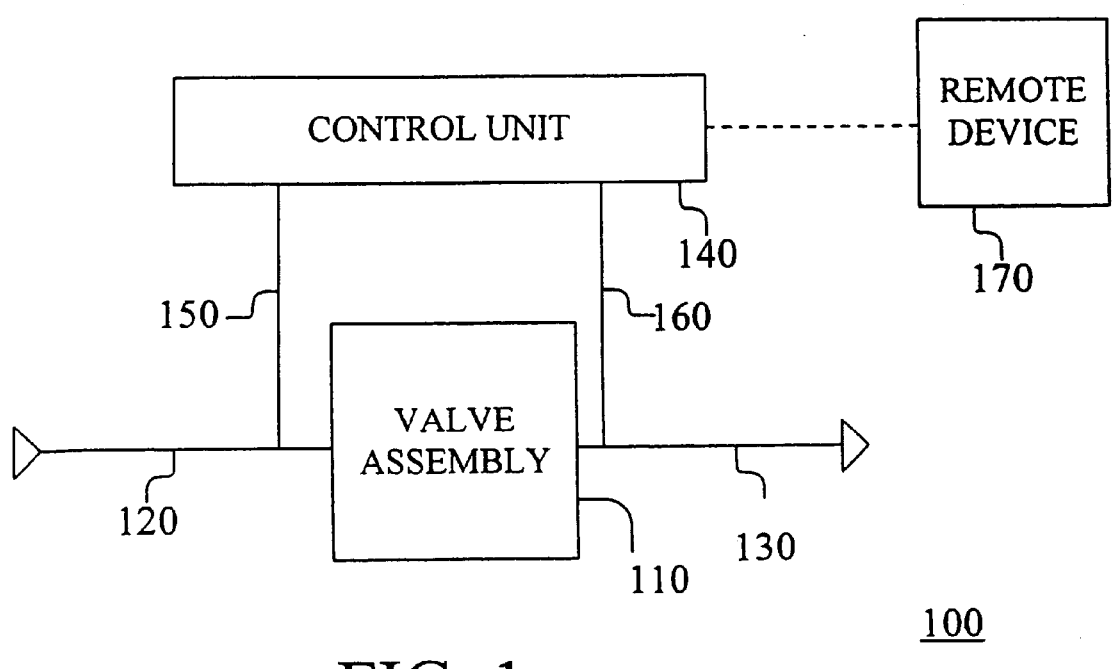
FIG. 1 is a block diagram of a system for testing a valve assembly.

Referring to FIG. 1, a system 100 for testing fluid flow in a valve assembly 110 positioned between a supply line 120 and a delivery line 130 includes a control unit 140. The control unit 140 is coupled to the supply line 120 through a supply connecting line 150, and to the delivery line 130 through a delivery connecting line 160, and, as indicated by the dashed line in FIG. 1, is optionally in communication with a remote device 170.

The valve assembly 110 includes a valve, e.g., valve 210 (FIG. 2), positioned between the supply line 120 and the delivery line 130. In addition to the valve, the valve assembly 110 can include any of a variety of mechanisms for securing the valve to the supply line 120 and to the delivery line 130. The valve assembly 110 is, for example, a backflow preventer assembly, such as, for example, a reduced pressure principle assembly ("RP assembly"), a double check valve assembly ("DC assembly"), or a pressure vacuum breaker assembly ("PVB assembly").

The control unit 140 serves a variety of purposes, including, for example, testing the valve assembly 110, monitoring the valve assembly 110, or manipulating the valve assembly 110 or the flow through the valve assembly. These and other operations by the control unit 140 involve, for example, sampling pressure or flow at one or more locations in the valve assembly 110, manipulating a valve or vent, or bypassing a valve. The control unit 140 also includes, for example, a connection between the control unit 140 and the valve assembly 110 for accessing a location within the valve assembly 110.

The control unit 140 includes a variety of components. The term component is used broadly and includes, for example, a hardware device, software, firmware, micro code, or a combination of the elements. Examples of various components or devices that the control unit 140 can include are a smart device, a communications component, another electronic or partially-electronic component, a flow sensing device, a flow control component, or another flow-related component.

Figure 2:
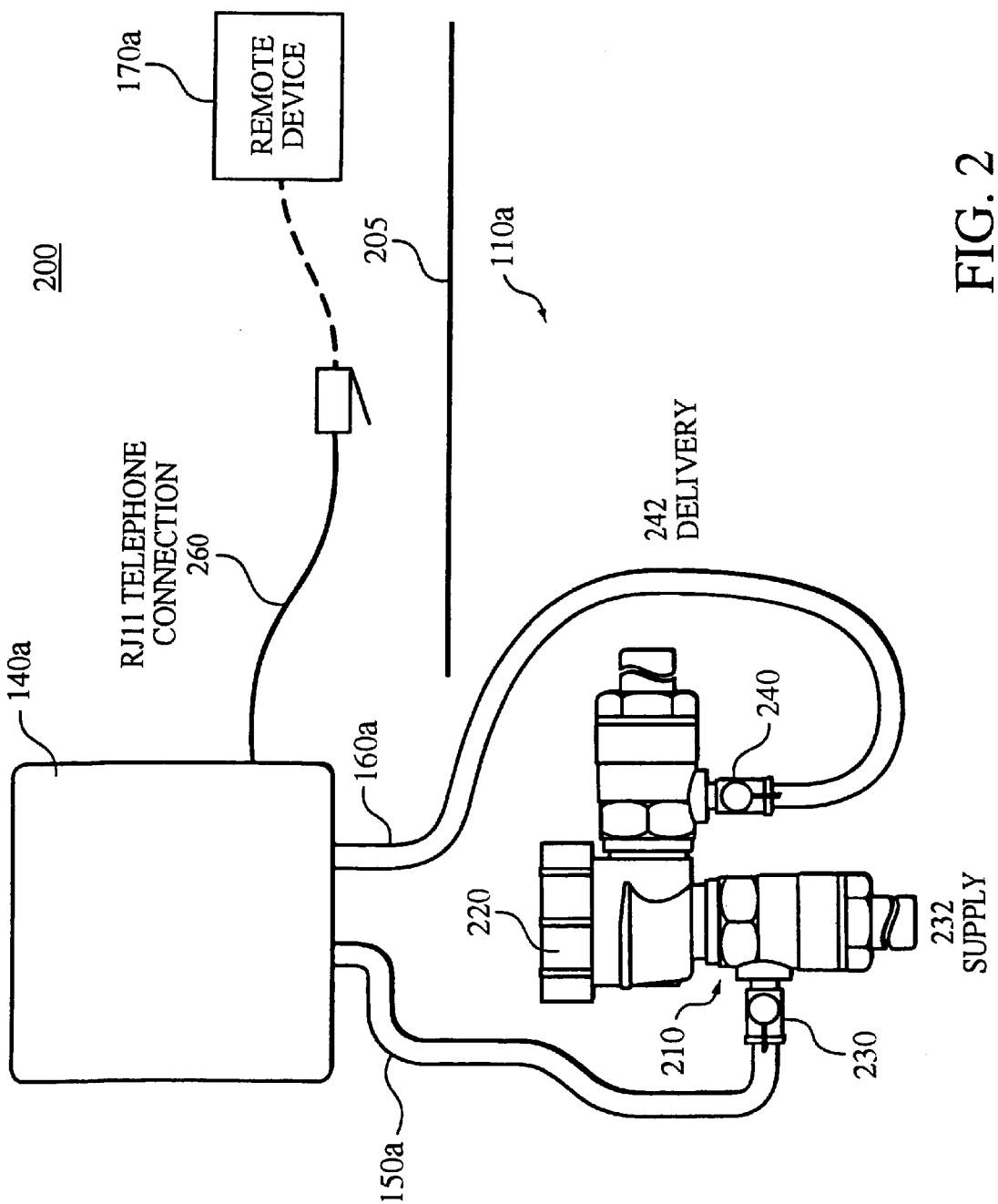
FIG. 2 is an illustration of one implementation of the system of FIG. 1.

Referring to FIG. 2, in a particular implementation, a system 200 includes a valve assembly 110a implemented as a PVB assembly. The valve assembly 110a includes the components below the line 205, including check valve 210, an air inlet valve 220 downstream from the check valve 210, a supply valve 230 coupled to the supply side 232 of the check valve 210, and a delivery valve 240 coupled to the downstream (delivery) side 242 of the check valve 210.

The check valve 210 is normally closed and is configured to open upon a forward pressure exceeding a given threshold ("forward pressure threshold"), such as, for example, one pound per square inch ("psi") or five psi. The air inlet valve 220 is normally closed and is configured to open, allowing air to enter, when the pressure on the downstream side of the check valve 210 minus the atmosphere pressure is less than a predetermined threshold ("air inlet pressure differential"), such as, for example, one psi.

The system 200 further includes a control unit 140a which is an implementation of the control unit 140. The control unit 140a is coupled to (1) the supply valve 230 through a supply connecting line 150a, and (2) the delivery valve 240 through a delivery connecting line 160a. The control unit 140a is also coupled to a telephone connection 260 for optional communication with a device 170a. The supply valve 230 provides the control unit 140a with access to supply pressure. The delivery valve 240 provides the control unit 140a with access to delivery pressure.

Figure 3:
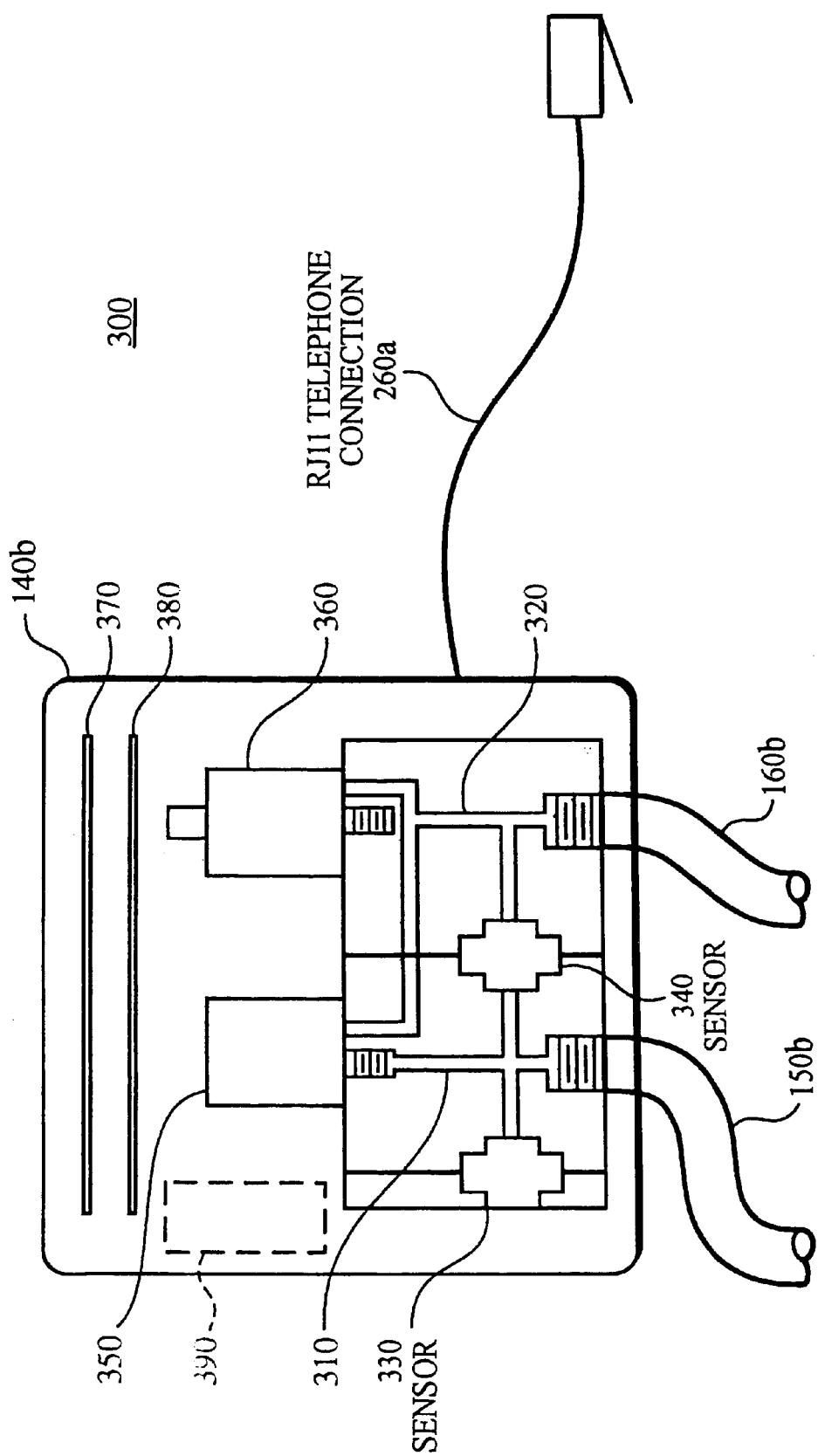
FIG. 3 is an illustration of one implementation of the control unit in FIG. 1.

Referring to FIG. 3, a system 300 includes a control unit 140b that includes a supply feed line 310 coupled to a supply connecting line 150b, a delivery feed line 320 coupled to a delivery connecting line 160b, a supply pressure sensor 330 coupled to the supply feed line 310, and a differential pressure sensor 340 coupled to both the supply feed line 310 and the delivery feed line 320. Coupled to both the supply feed line 310 and the delivery feed line 320 is a bypass 350, and coupled to the delivery feed line 320 is a vent 360.

The control unit 140 includes a test logic circuit board ("logic board") 370, a communication circuit board ("communication board") 380, and a battery 390 that is optional, as indicated by the dashed lines. The logic board 370 is coupled to the supply pressure sensor 330, the differential pressure sensor 340, the bypass 350, the vent 360, and the communication board 380. The communication board 380 is further coupled to a telephone connection 260a. The battery 390 is coupled to both the logic board 370 and the communication board 380.

The supply feed line 310 provides supply pressure (and fluid) to the supply pressure sensor 330, the differential pressure sensor 340, and the bypass 350. The delivery feed line 320 provides delivery pressure (and fluid) to the differential pressure sensor 340, the bypass 350, and the vent 360. The supply pressure sensor 330, for example, part number 105-0300-GASG, produced by Sentir Semiconductor, senses the supply pressure, and the differential pressure sensor 340, for example, part number 100-150-GASG, produced by Sentir Semiconductor, senses the value of the supply pressure minus the delivery pressure. The bypass 350 is used, for example, to selectively couple the supply feed line 310 and the delivery feed line 320 to bypass flow around the check valve 210 (FIG. 2). The vent 360 is used, for example, to selectively vent the delivery feed line 320.

Figure 4:
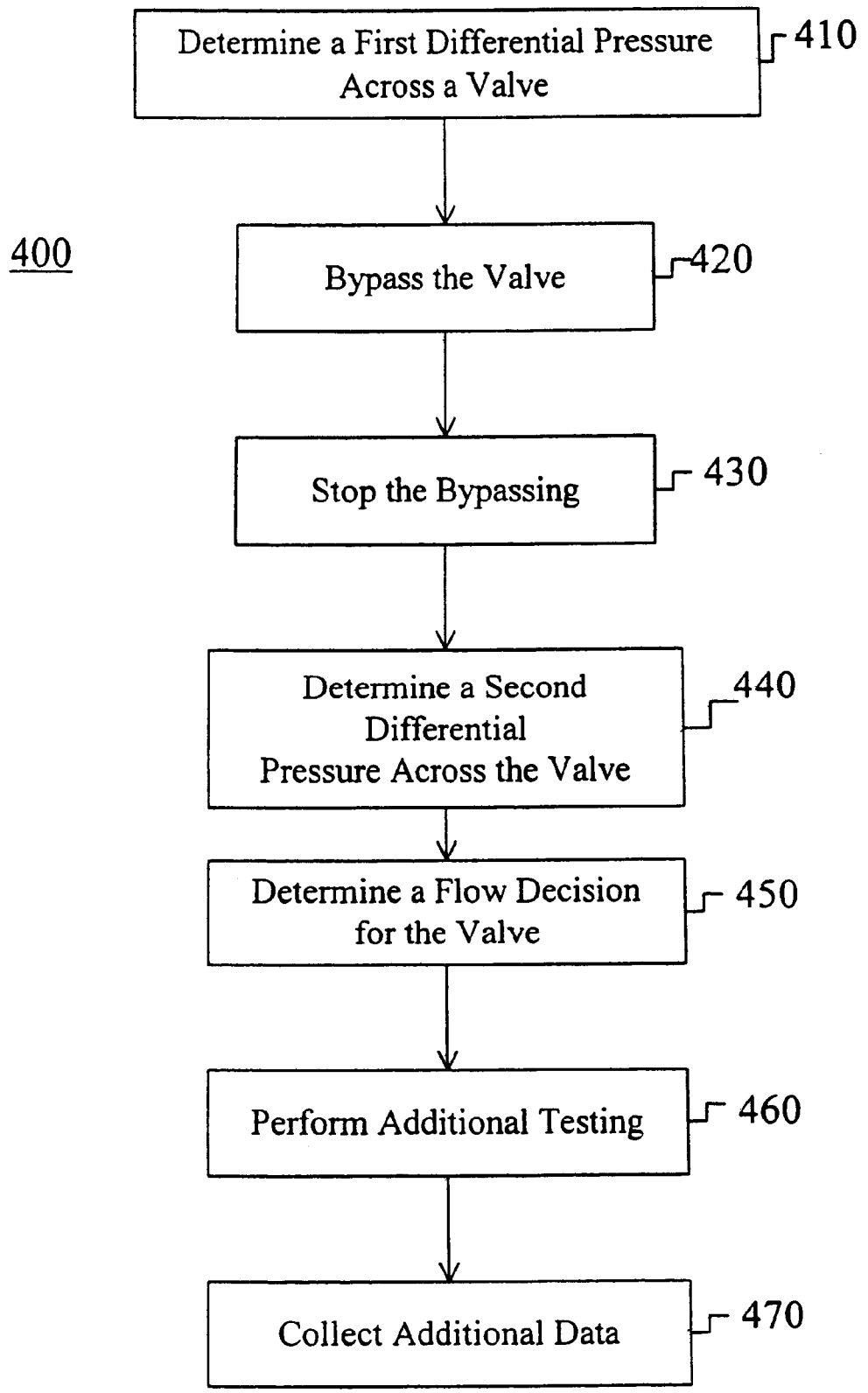
FIG. 4 is a flow chart of a process for testing a valve assembly.

Referring to FIG. 4, a process 400 is shown that can be used, for example, to determine a flow decision for a valve. Determining a flow decision involves, e.g., determining a flow direction, such as, for example determining whether a particular flow is forward, backward, or not flowing (referred to as "no flow"). Determining a flow decision alternatively, or additionally, involves determining that a flow is not in a particular direction, such as, for example, not forward, not backward, or not no-flow. A flow decision can be determined explicitly or implicitly. The process 400 can also be used for a variety of other tests and monitoring operations.

The process 400 includes determining a differential pressure across a valve (410). This is done in a variety of ways, such as, for example, using a differential pressure transducer, using two pressure transducers and subtracting the results, using a pressure switch to determine the differential pressure to within a range (for example, determining that the differential pressure is greater than 5 psi), or using an absolute differential pressure transducer to determine the differential pressure to within a range (for example, determining that the differential pressure is either greater than 20 psi or less than negative 20 psi).

The process can be halted after determining the first differential pressure. For example, in one implementation, an absolute pressure beyond a predetermined threshold, such as, for example, 35 psi, is taken to indicate that there is blockage in the valve assembly or that a pressure sensor or other component is malfunctioning.

The valve is bypassed (420) using a bypass line or other mechanism, and the bypassing is later stopped (430). If the valve is closed, bypassing allows the differential pressure to dissipate. Any relevant criteria can be used to determine when to stop the bypassing, such as, for example, a fixed length of time, a fixed absolute or relative pressure change, or a fixed rate of pressure change. In one implementation, a 0.055 inch orifice bypass line is activated for three seconds. The various criteria can be determined in advance or be determined dynamically. Further, in one implementation, the valve is bypassed at the same time that the first differential pressure value is determined.

A second differential pressure value is determined (440), using either the same mechanism used to determine the first differential pressure value or using a different mechanism. In one implementation, the second differential pressure value is determined prior to stopping the bypassing (430), thus reversing the order of those two operations from that shown in the process 400.

After determining the two differential pressure values, a flow decision is determined (450). A first differential pressure value greater than or equal to the valve's forward pressure threshold (defined earlier), followed by a substantially unchanged second differential pressure value, indicates that there is a forward flow through the valve. A first differential pressure value less than zero, followed by a substantially unchanged second differential pressure value, indicates that there is a backward flow through the valve. A non-zero first differential pressure value, followed by a substantially zero second differential pressure value, indicates that there is substantially no flow through the valve. "Substantially no flow" allows that there could be, at least, a flow through a check valve that does not alter the check valve differential pressure more than the system reading error percentage. Quantification of these terms involving "substantially" depends in part on the precision of the differential pressure determination, but is not limited to that precision. In one application, "substantially unchanged" includes, for example, pressure values within 0.2 psi of each other, but this varies by implementation.

The flow decision can also be determined earlier, such as, for example, immediately after determining the first differential pressure (410), without bypassing (420), stopping the bypassing (430), or determining a second differential pressure (440). In one such implementation, a first differential pressure value less than zero indicates that the flow is not forward. A first differential pressure value greater than zero indicates that the flow is not backward. A large absolute value indicates that there is either a forward or a backward flow and not a no-flow.

After determining a flow decision for the valve (450), additional testing can be performed (460) and/or additional data can be collected (470). The additional testing (460) or data collection (470) can relate to the valve being addressed. For example, in the system 200, a flow decision can be determined for the check valve 210, and then determined again for the same valve, making the second determination immediately as a verification, or at some later time as part of a monitoring process. The additional testing or data collection can also relate to another part of the valve assembly. A monitoring process can also collect data over a period of time.

Using the process 400 to determine whether there is a no flow condition obviates the need for a flow sensing device to make that determination. Such an implementation allows an existing valve assembly to be retrofitted without having to insert a flow sensing device, although a flow sensing device can still be included for backup, verification, or some other purpose. The process 400 allows a flow decision to be determined from hydraulic parameters rather than from mechanical measuring of the flow.

Figure 5:
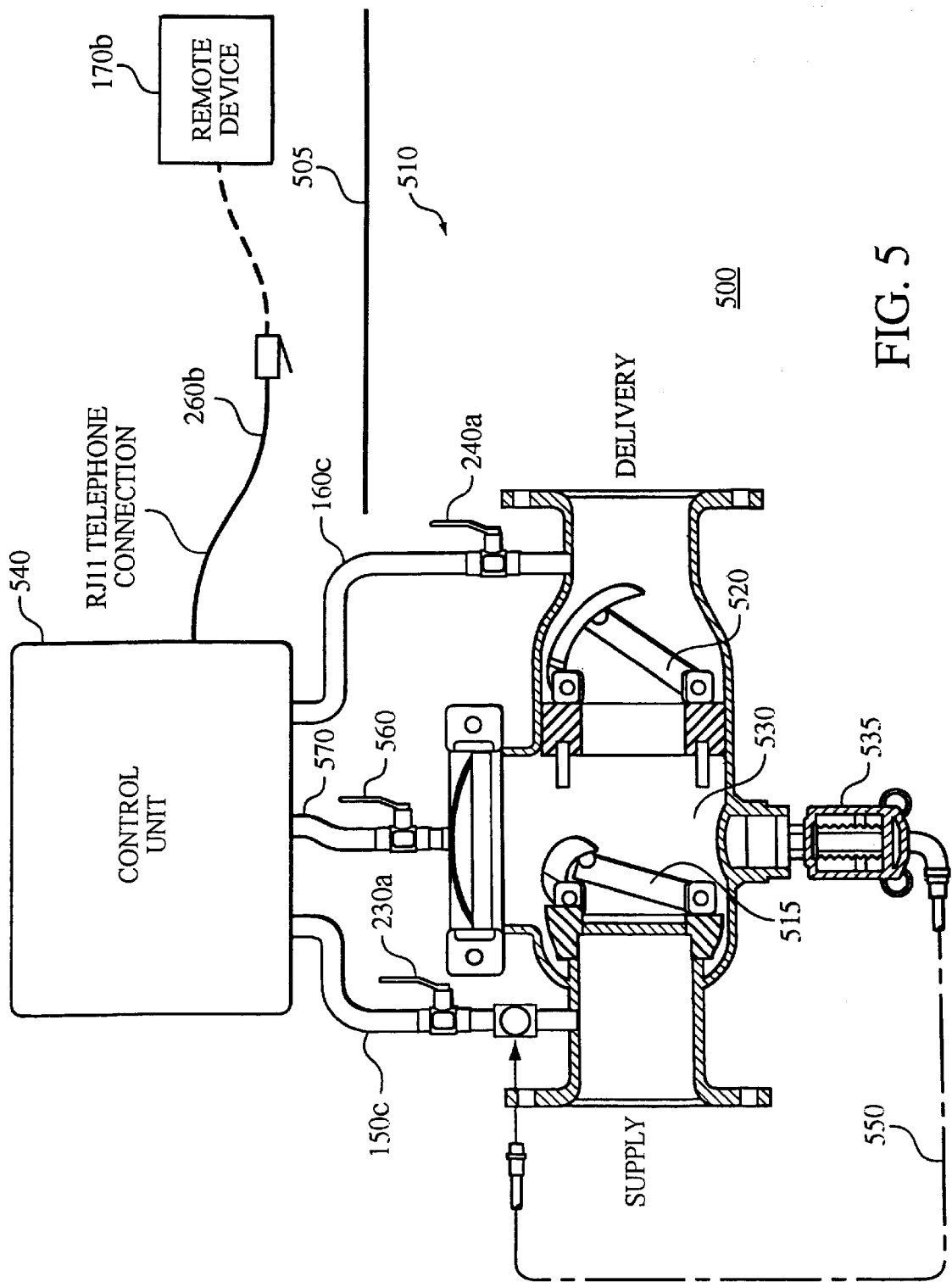
FIG. 5 is an illustration of a system for testing a reduced pressure backflow preventer assembly.

Referring to FIG. 5, a system 500 is a particular implementation of the system 100 of FIG. 1. The system 500 includes a valve assembly 510, implemented as a RP assembly. The valve assembly 510 includes the components below the line 505, including an upstream check valve 515 and a downstream check valve 520, with the two check valves 515, 520 configured so as to define a zone 530 between them. The valve assembly 510 includes a relief valve 535 positioned in the zone 530 for venting to atmosphere, and a connection 550 coupling the relief valve 535 to the supply side of the upstream check valve 515. The valve assembly 510 includes a supply valve 230a coupled to the supply side of the upstream check valve 515, a zone valve 560 coupled to the zone 530, and a delivery valve 240a coupled to the downstream side of the downstream check valve 520.

The system 500 includes a control unit 540 and three connecting lines 150c, 570, 160c that couple the control unit 540 to the valve assembly 510. The control unit 540 is coupled to (1) the supply valve 230a through a supply connecting line 150c, (2) the zone valve 560 through a zone connecting line 570, and (3) the delivery valve 240a through a delivery connecting line 160c. The control unit 540 is also coupled to a telephone connection 260b for optional communication with a device 170b.

The upstream check valve 515 is analogous to the check valve 210 of the system 200 and, typically, has a higher forward pressure threshold, such as, for example, five psi rather than one psi. The downstream check valve 520 is similar to the upstream check valve 515 except that the forward pressure threshold of the downstream check valve 520 is typically smaller than the forward pressure threshold of the upstream check valve 515, such as, for example, one psi as compared to five psi. The zone 530, as described above, is the volume between the two check valves 515, 520. The relief valve 535 is normally closed and actuates, that is, opens, to relieve pressure in the zone 530. Such pressure arises, for example, because of a backflow or backpressure. The relief valve 535 opens when the supply pressure minus the pressure in the zone is less than a predetermined threshold ("relief pressure differential"), such as, for example, two psi. The connection 550 provides the relief valve 535 with supply pressure, allowing the relief valve 535 to stay closed based upon the difference between the supply pressure and the zone pressure. The zone valve 560 provides the control unit 540 with access to the zone 530 through the zone connecting line 570 to determine the pressure in the zone 530.

Figure 6:
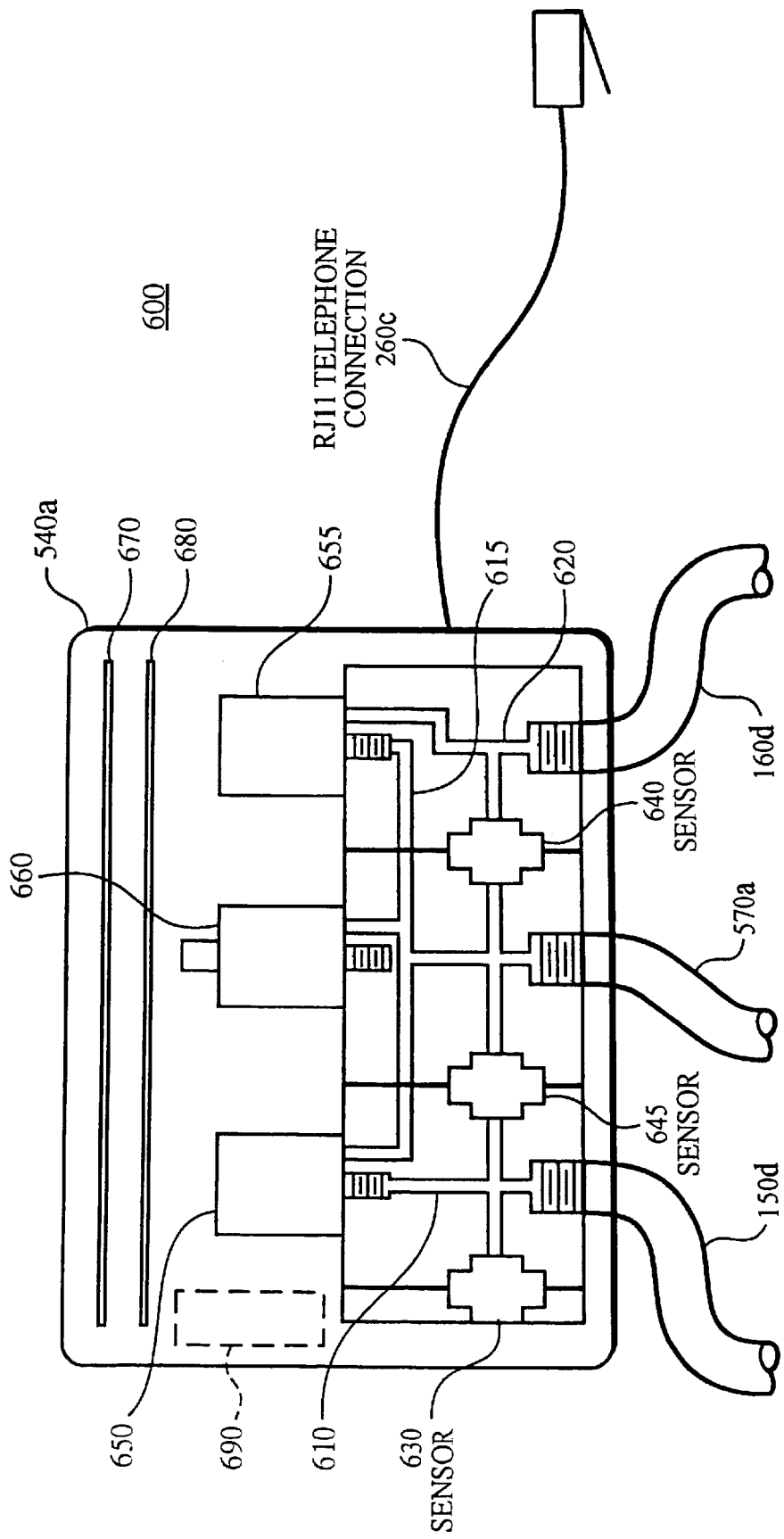
FIG. 6 is an illustration of one implementation of the control unit in FIG. 5.

Referring to FIG. 6, a system 600 includes a control unit 540a that is coupled to (1) a supply connecting line 150d, (2) a zone connecting line 570a, (3) a delivery connecting line 160d, and (4) a telephone connection 260c. The control unit 540a includes a supply feed line 610 coupled to the supply connecting line 150d, a zone feed line 615 coupled to the zone connecting line 570a, and a delivery feed line 620 coupled to the delivery connecting line 160d. The control unit 540a includes a supply pressure sensor 630 coupled to the supply feed line 610, a downstream differential pressure sensor 640 coupled to both the zone feed line 615 and the delivery feed line 620, and an upstream differential pressure sensor 645 coupled to both the supply feed line 610 and the zone feed line 615.

An upstream bypass 650 is coupled to both the supply feed line 610 and the zone feed line 615. A downstream bypass 655 is coupled to both the zone feed line 615 and the delivery feed line 620. A zone vent 660 is coupled to the zone feed line 615.

A logic board 670 is coupled to the supply pressure sensor 630, the upstream differential pressure sensor 645, the downstream differential pressure sensor 640, the upstream bypass 650, the zone vent 660, the downstream bypass 655, and a communication board 680. The communication board 680 is further coupled to the telephone connection 260. An optional battery 690 is coupled to both the logic board 670 and the communication board 680.

Figure 7:
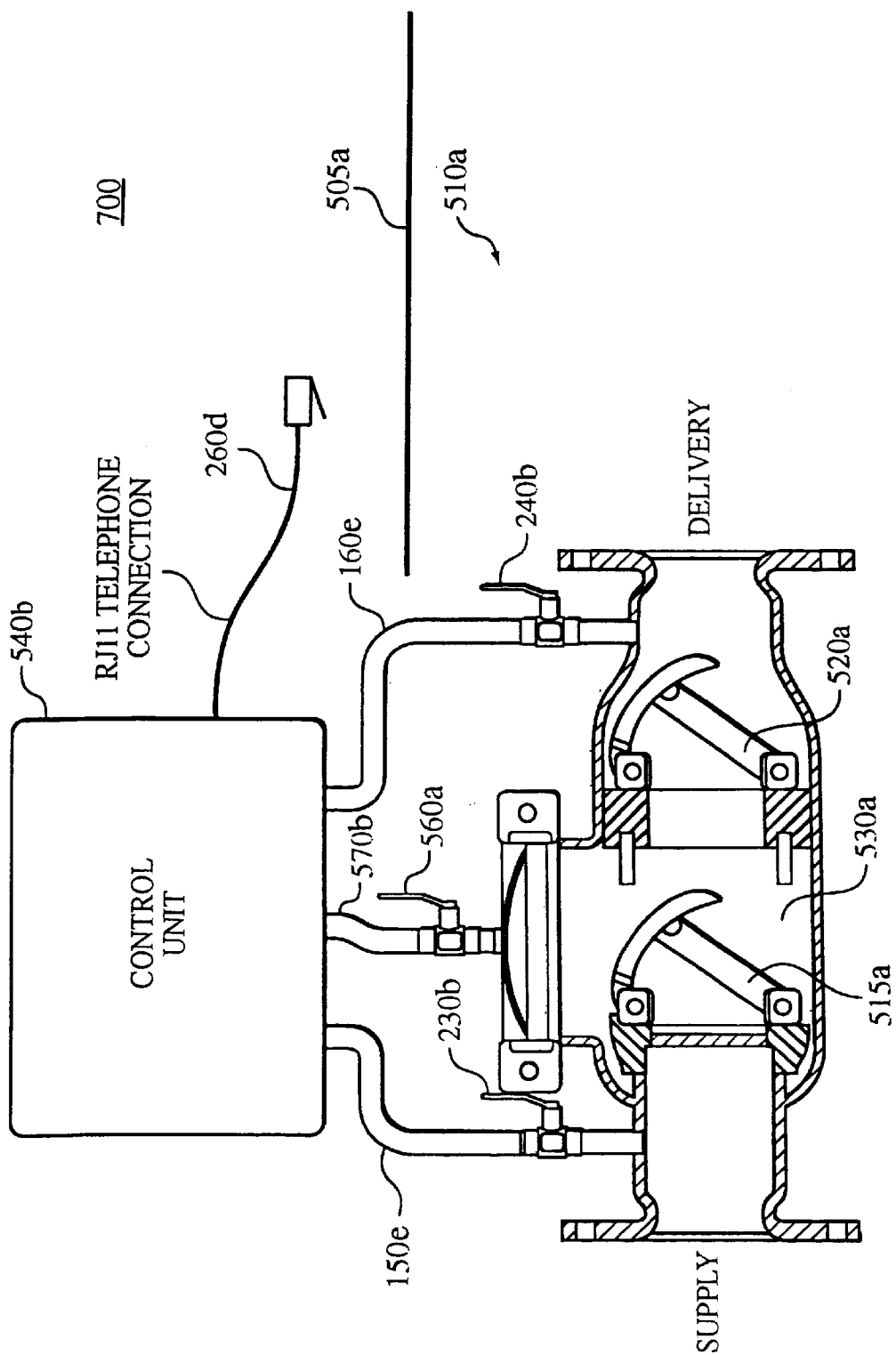
FIG. 7 is an illustration of a system for testing a double check valve backflow preventer assembly.

Referring to FIG. 7, a system 700 is another implementation of the system 100 of FIG. 1. The system 700 is analogous to the system 500 of FIG. 5 and differs, for example, in that there is no relief valve 535. The system 700 implements a DC assembly.

Referring again to FIG. 4, the process 400 can be applied to either or both of the check valves in the RP and DC assemblies of FIGS. 5 and 7. One implementation involving a RP assembly applies the process 400 to the downstream check valve so as to avoid actuating the relief valve during a bypass operation. Additionally, in implementations including a DC or RP assembly, additional testing (460) or data collection (470) can involve testing the second valve in the assembly, e.g., a flow decision for the upstream check valve in a DC assembly is determined, and then a flow decision for the downstream check valve is determined to verify the first flow decision.

Figure 8:
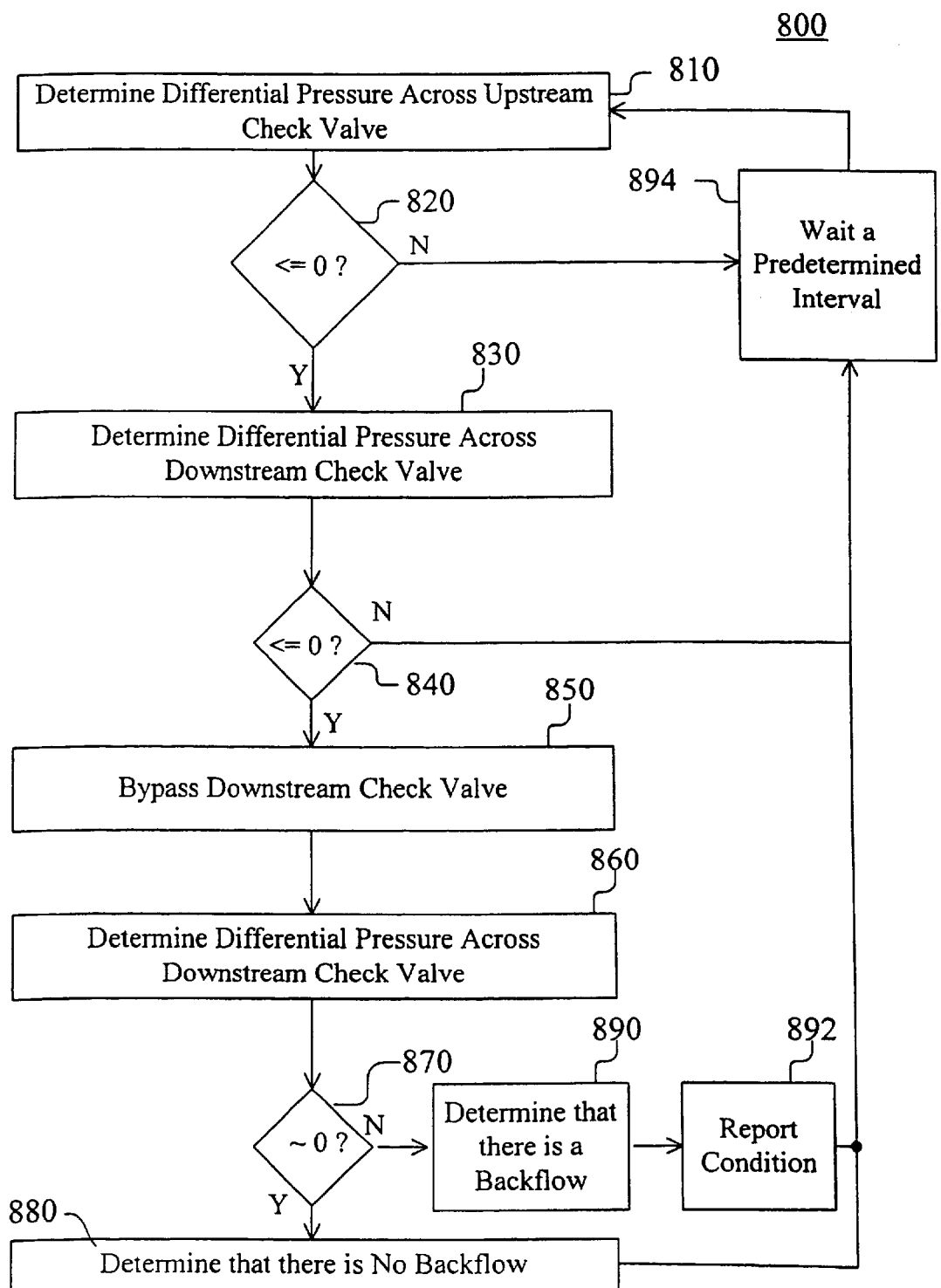
FIG. 8 is a flow chart of a process for monitoring for a backflow.

Referring to FIG. 8, a process 800 for monitoring for a backflow includes determining the differential pressure across the upstream check valve in, for example, a DC assembly or a RP assembly (810). If the differential pressure is less than or equal to zero (820), the differential pressure across the downstream check valve is determined (830). If the differential pressure across the downstream check valve is also less than or equal to zero (840), the downstream check valve is bypassed (850) and a second differential pressure is determined across the downstream check valve (860). The second differential pressure substantially going to or remaining at zero (870) indicates that there is no backflow (880). The second differential pressure remaining substantially unchanged from a negative value indicates that there is a backflow (890) and the condition is reported (892). Reporting a condition can include, for example, communicating information to a local or a remote device, activating an alarm, recording data, displaying data, or taking remedial action. The monitoring process can repeat regularly by waiting a predetermined interval (894), which can very depending on previous monitoring results or other conditions.

Figure 9:
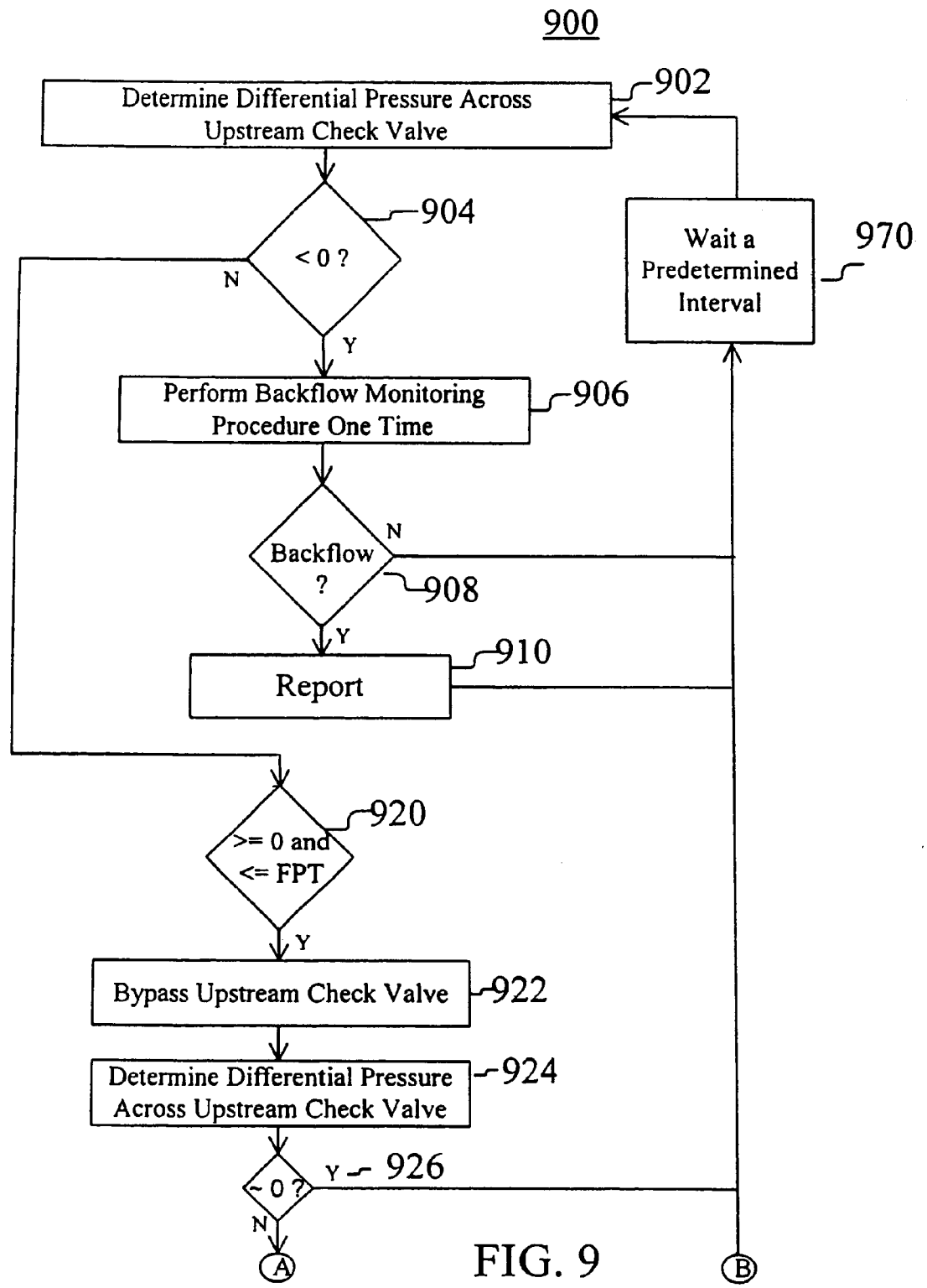
FIGS. 9 and 9A are a flow chart of a process for monitoring whether a relief valve is discharging.
Figure 9A:
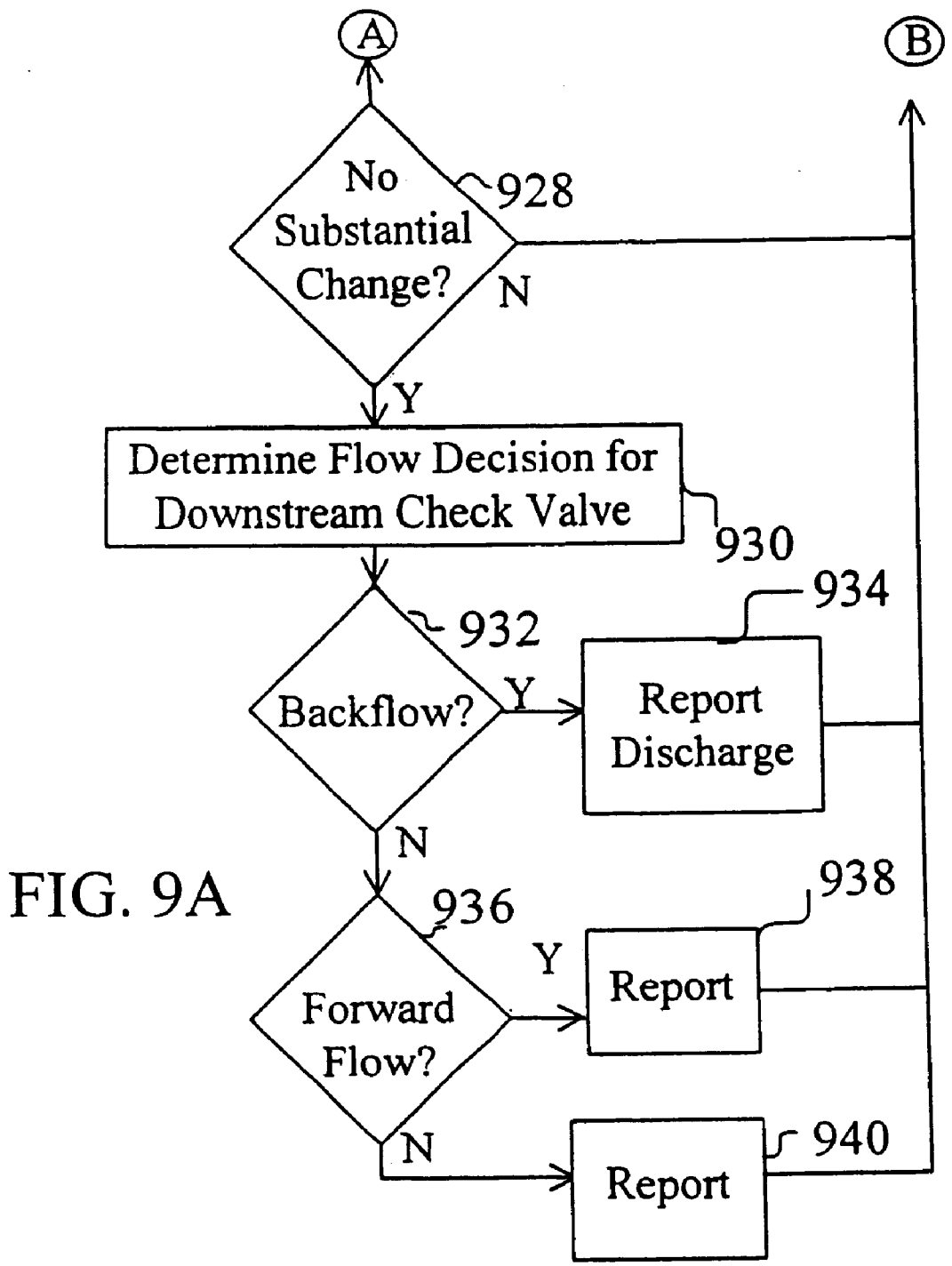

Referring to FIGS. 9 and 9A, a process 900 for monitoring whether a relief valve in, for example, a RP assembly is discharging begins by determining the differential pressure across the upstream check valve (902). The possible values of the differential pressure are divided into three sets, values less than zero, values between zero and the forward pressure threshold of the upstream check valve, inclusive, and values greater than the forward pressure threshold.

First, if the differential pressure across the upstream check valve is less than zero (904), then there can be no forward flow through the upstream check valve. Accordingly, there can be no sustained relief valve discharge unless there is a backflow through the downstream check valve. To check for such a backflow, a backflow monitoring procedure, such as, for example, that described in the process 800, is performed (906). If there is a backflow (908), it is determined that the relief valve is discharging and this condition is reported (910). Otherwise, the monitoring process completes an iteration.

Second, if the differential pressure across the upstream check valve is greater than or equal to zero and less than or equal to the forward pressure threshold ("FPT") (920), then the upstream check valve is bypassed (922) and the differential pressure is determined again (924). The possible values of the second differential pressure determination are divided into three possibilities based on whether the differential pressure substantially changes and/or substantially goes to zero.

If the differential pressure substantially goes to zero after the bypass (926), it is determined that there is no flow through the upstream check valve and no discharge from the relief valve and the monitoring process completes an iteration. If the first differential pressure value was below the forward pressure threshold, it could have been due to a pressure fluctuation in the supply. Note that the reference to the differential pressure going to zero across an upstream check valve of a RP assembly can also be understood to mean that the differential pressure merely goes to the relief pressure differential, for example, 2 psi.

If the differential pressure does not substantially change after the bypass (928; FIG. 9A), it is assumed that either (1) there is a forward flow through the upstream check valve and the relief valve is discharging, or (2) the upstream check valve is closed but the relief valve is discharging. A flow decision is determined for the downstream check valve (930), as described earlier. If there is a backflow through the downstream check valve (932), it is determined that the relief valve is discharging and the condition is reported (934). If there is a forward flow through the downstream check valve (936), then the upstream check valve is not working properly and it is assumed that the relief valve is discharging, and that condition is reported (938). If there is no flow through the downstream check valve, then it is determined that the relief valve is discharging due to either a faulty upstream check valve or a faulty relief valve and the condition is reported (940).

If the differential pressure around the upstream check valve has a substantial change and does not approach zero after the bypass (928; FIG. 9A), it is assumed that there is an abnormality and the monitoring process completes an iteration. One optional confirmation of the existence of an abnormality is to determine the differential pressure across the across the upstream check valve a third time as a verification. An example of an abnormality is, for example, a problem with the upstream check valve, such as, for example, a defective seal.

Third, if the differential pressure across the upstream check valve is greater than the forward pressure threshold (920; FIG. 9), then it is assumed that the relief valve is not discharging and the monitoring process completes an iteration.

After the monitoring process ends, it can be repeated after, for example, waiting for a predetermined interval (970; FIG. 9). The waiting period can vary depending on the conditions detected during the monitoring process or other factors.

Another monitoring process regularly determines a differential pressure across a valve and makes a pass/fail decision for the valve based on the pressure value. For example, in one implementation of a test of the check valve in a PVB assembly, a differential pressure less than zero results in a "fail" decision because backpressure typically cannot be tolerated.

A second implementation that monitors for a discharge from a relief valve determines the differential pressure across the upstream check valve at regular intervals. If the differential pressure is less than the forward pressure threshold, then it is determined that the relief valve is discharging and this condition is reported. Further, the differential is determined again after a short delay to determine if the discharge was transient, due, for example, to a supply pressure fluctuation, or is continuing. This determination is also reported.

Figure 10:
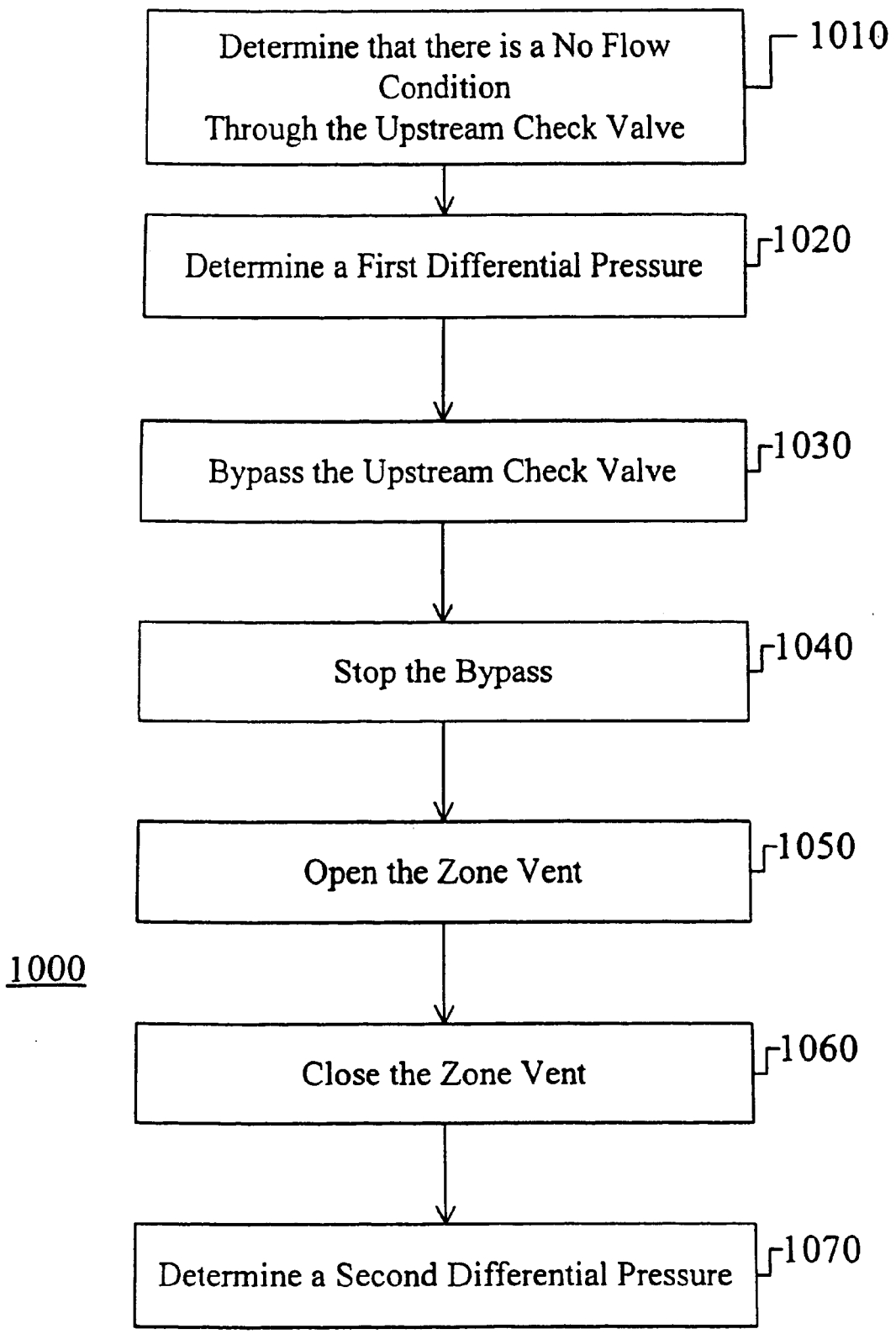
FIG. 10 is a flow chart of a process for testing a relief valve.

Referring to FIG. 10, a process 1000 for testing a relief valve is used, for example, to activate a relief valve in a RP assembly, ensuring that the relief valve opens under appropriate conditions, and to restore the zone to a normal operating pressure. The process 1000 includes determining that there is a no flow condition through the upstream check valve of a RP assembly (1010). This is done using any of a variety of techniques, including, for example, using a flow sensing device or using the process 400 of FIG. 4. After determining that there is no flow (1010), or during the process of making that determination, a first differential pressure is determined across the upstream check valve (1020). This pressure value can be used to determine whether the valve is operating normally. For example, in a no flow condition without backpressure the differential pressure is typically close to the forward pressure threshold of the valve.

The valve is then bypassed (1030) and, at some later time, the bypassing is stopped (1040). If the initial pressure is near the forward pressure threshold, for example, 5 psi, then bypassing the valve allows the zone pressure to draw nearer to the supply pressure. When the zone pressure draws to within the relief pressure differential, for example, 2 psi, the relief valve is designed to open. The bypass stays open long enough to allow the relief valve to open. The bypass can be stopped based on, for example, a timer or a differential pressure value.

The relief valve is designed to close when the pressure differential across the upstream check valve becomes greater than the relief pressure differential. In order to increase the differential further, a zone vent is opened (1050) and, at some later time, the zone vent is closed (1060). A variety of methods are used to determine when to close the zone vent, including, for example, closing the zone vent after a particular amount of time, or after the differential pressure across the upstream check valve gets to a particular value. One implementation opens a solenoid having a 0.025 inch orifice for 0.5 seconds. The zone vent can be separate from the relief valve, as in the combination of systems 500 and 600, or the zone vent and the relief valve can be a single structure.

The differential pressure across the upstream check valve is optionally determined again (1070). The pressure can be determined at one or more of a variety of points in the process, four examples of which follow. First, the differential pressure can be determined before the bypass is stopped, so as to ensure that the zone pressure is high enough to activate the relief valve. Second, the differential pressure can be determined before the zone vent is opened, so as to verify that the relief valve opened. Third, the differential pressure can be determined while the zone vent is open, so as to determine when to close the zone vent. Fourth, the differential pressure can be determined after the zone vent is closed, so as to ensure that the zone vent restored the differential pressure to a desired value.

In one implementation, the zone vent is kept open long enough to bring the differential pressure up to the forward pressure differential of the upstream check valve and the pressure differential is determined after the zone vent is closed. This provides another test of the upstream check valve which can be useful, particularly if the first differential pressure determination was inconclusive. The first determination could have been inconclusive if a pressure surge in the supply caused the differential pressure across the upstream check valve to be less than the forward pressure differential.

The use of a zone vent can also be integrated into the monitoring processes discussed earlier.

Implementations

Referring again to FIG. 1, the valve assembly 110 can include any of a variety of mechanisms for securing the valve to the supply line 120 and to the delivery line 130. Such mechanisms can include, for example, a housing, a bracket, a gasket, or bolts or other fasteners.

Referring again to FIGS. 1 and 3, lines 120, 130, 150, 160, 310, 320 are, for example, pipes, hoses, tubes, conduits, or paths of various (and/or varying) cross-sectional areas. As an example, the connecting lines 150, 160 have smaller cross-sectional areas than the supply line 120 and the delivery line 130. As another example, the supply feed line 310 and the delivery feed line 320 have smaller cross-sectional areas than the supply connecting line 150 and the delivery connecting line 160, respectively. The lines 120, 130, 150, 160, 310, 320 are implemented with any mechanism that, for example, at least partially contains and provides a path for one or more fluids, one or more solids, or some combination. Fluids include, for example, water, oil, and air. A fluid can be combined with a solid in a combination, such as, for example, salt water, sewage, or waste water from various chemical processes. In order to block solids, including debris, larger than a predetermined size in one of the lines 120, 130, 150, 160, 310, 320 or the valve assembly 110, a strainer or screen, for example, can be used.

As described earlier, the control unit 140 can include a variety of components. Smart devices include, for example, a computer, a printed circuit board, a processor, a controller, an application specific integrated circuit ("ASIC"), a programmable logic device ("PLD"), firmware, a random access memory ("RAM"), a read only memory ("ROM"), or other memory programmed or designed with appropriate instructions. Communications components include, for example, a universal asynchronous receiver-transmitter ("UART"), a modem, a cable modem, an Ethernet connection, or wireless devices. Other electronic (or partially electronic) components include, for example, a display device (such as, for example, a screen, a light, a light-emitting diode ("LED"), or a printer), a speaker, or a storage device (such as, for example, an external or internal hard disk, a floppy disk, a CD, a DVD, a cassette, a tape, a ROM, a RAM, or other memory). Flow sensing devices include, for example, a flow meter, a proportional-type flow meter, a flow switch, or a proximity switch. A flow meter typically has a rotating element such as, for example, an impeller. Flow control components include, for example, a valve (for example, a check valve, a relief valve, or an air inlet valve), a bypass, and a vent (for example, a solenoid or a relief valve). Other flow-related components include, for example, pressure sensing components, such as, for example, pressure switches, pressure transducers, differential pressure switches or transducers, absolute pressure switches or transducers, or absolute differential pressure switches or transducers. Pressure sensing components, and other flow-related components, can provide, for example, a signed value, an absolute value, a differential value, or some combination. In general, the devices need not provide exact values, but can, for example, provide an indication of a range for the value such as that provided, for example, by a pressure switch configured for a predetermined threshold.

The remote device 170 is any type of device in communication with the control unit 140. The remote device 170 is used, for example, to communicate instructions to, or receive data from, the control unit 140. The control unit 140 can also, or alternatively, communicate with a local device.

Referring again to FIG. 6, the supply pressure sensor 630 senses the supply pressure; the upstream differential pressure sensor 645 senses the value of the supply pressure minus the zone pressure; and the downstream differential pressure sensor 640 senses the value of the zone pressure minus the delivery pressure. The upstream bypass 650 is used, for example, to selectively couple the supply feed line 610 and the zone feed line 615. Similarly, the downstream bypass 655 is used, for example, to selectively couple the zone feed line 615 and the delivery feed line 620. The zone vent 660 is used, for example, to selectively vent the zone feed line 615.

Elements 610, 620, 630, 640, 650, 660, 670, 680, and 690 are analogous to elements 310, 320, 330, 340, 350, 360, 370, 380, and 390 in the system 300 of FIG. 3. The zone feed line 615 is analogous to the supply feed line 610. The upstream differential pressure sensor 645 is analogous to the downstream differential pressure sensor 640. The downstream bypass 655 is analogous to the upstream bypass 650. Although analogous, the elements are not necessarily identical.

The supply pressure sensor 630, the upstream differential pressure sensor 645, and the downstream differential pressure sensor 640 can be implemented using any device or combination of devices that provides relevant pressure information, such as, for example, a flow-related component, described earlier. As an example, two pressure transducers can be used, and their values subtracted to determine a differential pressure. The two pressure transducers can be collectively coupled to the supply pressure and the zone pressure. For example, one of the pressure transducers can be coupled to the supply pressure and the second can be coupled to the zone pressure.

The upstream bypass 650 and the downstream bypass 655 can be implemented using, for example, any mechanism or device capable of coupling and of allowing, at least partially, the contents of the coupled areas to flow. In one implementation, each bypass 650, 655 uses a bypass solenoid with a diameter of 0.055 inches. The zone vent 660 can be implemented using any suitable device or mechanism, such as, for example, a bleed solenoid.

The logic board 670 can serve various purposes, such as, for example, controlling the various components coupled to the logic board 670. The logic board 670 can be implemented by any suitable combination of one or more mechanisms, devices, or components. Various implementations use one or more smart devices, described earlier. Additionally, various implementations also include one or more other electronic or partially-electronic components, described earlier.

The communication board 680 facilitates communication with a remote (or local) device and can be implemented by any suitable combination of one or more mechanisms, devices, or components. Various implementations use one or more communications components, described earlier. The communication board 680 and the logic board 670 can be combined into a single device.

The battery 690 provides power to the logic board 670, the communications board 680, and/or other devices in the control unit 140 of the system 600. The provided power is, for example, primary, secondary, or backup. Accordingly, implementations vary in the size and characteristics of the battery, or batteries, used. Further, various implementation also include components to allow the use of alternating current being provided with a voltage of, for example, 110 volts or 220 volts. Another implementation does not contain a battery and uses only externally supplied power, either direct current or alternating current.

A number of implementations have been described. Nevertheless, it will be understood that various modifications can be made. For example, the features described can be embodied in a process, a device, or in a computer readable medium embodying instructions for a process. The medium can be, without limitation, a storage device, a smart device, or electromagnetic waves encoding or transmitting instructions. Accordingly, other embodiments are within the scope of the following claims.

What is claimed is:

1. A method of determining flow through a valve, the method comprising:

determining a first differential pressure across the valve;

bypassing the valve after determining the first differential pressure;

determining, after bypassing the valve, a second differential pressure across the valve; and determining a flow decision for the valve based on comparison of the first and second differential pressures, wherein determining the first differential pressure, bypassing the value, determining the second differential pressure, and deterring the flow decision are performed in an automated fashion.

2. The method of claim 1 wherein determining the flow decision comprises determining whether flow is forward, backward, or no flow.

3. The method of claim 2 wherein if the first differential pressure is within a predetermined positive range and the second differential pressure is substantially unchanged, the flow decision is a forward flow.

4. The method of claim 2 wherein if the first differential pressure is substantially non-zero and the second differential pressure is substantially zero, the flow decision is no flow.

5. The method of claim 2 wherein if the first differential pressure is within a predetermined negative range and the second differential pressure is substantially unchanged, the flow decision is a backward flow.

6. The method of claim 1 wherein determining the first differential pressure, bypassing the valve, determining the second differential pressure, and determining the flow decision are controlled from a remote location.

7. The method of claim 1 further comprising determining the flow decision without input from a flow meter.

8. The method of claim 1 wherein determining the first and second differential pressures comprises determining the first and second differential pressures to within a range.

9. The method of claim 8 wherein the range comprises values greater than a predetermined positive threshold.

10. The method of claim 1 further comprising collecting additional data and wherein the determined flow decision is based on the additional collected data as well as on comparison of the first and second differential pressures.

11. The method of claim 10 wherein collecting additional data comprises:

determining a first differential pressure for a second valve;

bypassing the second valve; and determining a second differential for the second valve.

12. The method of claim 1 further comprising collecting additional data after the flow decision is determined.

13. The method of claim 12 wherein if the flow decision is no flow, collecting additional data comprises performing a relief valve actuation test.

14. The method of claim 13 wherein performing the relief valve actuation test comprises opening a vent to atmosphere in a zone of a reduced pressure backflow preventer assembly, the zone including a relief valve.

15. The method of claim 1 wherein the valve is a check valve in a backflow preventer assembly.

16. The method of claim 1 further comprising stopping the bypassing, and wherein the second differential pressure is determined after the bypassing is stopped.

17. The method of claim 1 further comprising performing the method repeatedly.

18. The method of claim 1 wherein the method is performed for a first check valve in a reduced pressure backflow preventer assembly, and further comprising:

performing the method for a second check valve in the reduced pressure backflow preventer assembly; and determining whether a relief valve is discharging based on the first and second differential pressures across each of the two check valves.

19. The method of claim 1 wherein determining the flow decision for the valve comprises determining whether there is a backflow through the valve, and the method further comprises:

determining a differential pressure across a second valve prior to determining the first differential pressure across the valve; and determining a backflow decision for the second valve.

20. The method of claim 19 wherein the backflow decision for the second valve is determined prior to any explicit determination of whether there is a backflow through the valve and, thus, implicitly determines whether there is a backflow through the valve.

21. The method of claim 1 further comprising determining a pass/fail decision for the valve based on a comparison of at least one of the two differential pressures to a predetermined value.

22. The method of claim 1 wherein determining the first differential pressure, bypassing the valve, determining the second differential pressure, and determining the flow decision are performed while an operational level of fluid flow can flow through the valve.

23. The method of claim 1 wherein determining the first differential pressure, bypassing the valve, determining the second differential pressure, and determining the flow decision are performed using structure that is integrally coupled to the valve such that the structure is not portable or intended to be removed.

24. The method of claim 1 wherein determining the first differential pressure, bypassing the value, determining the second differential pressure, and determining the flow decision are performed prior to testing an ability of the valve, or of another valve in an assembly with the valve, to restrict flow in a given direction.

25. A computer program, residing on a computer-readable medium, for determining flow through a valve, the computer program comprising instructions for causing a computer to perform the following operations:

determine a first differential pressure across the valve;

bypass the valve after determining the first differential pressure;

determine, after bypassing the valve, a second differential pressure across the valve; and determine a flow decision for the valve based on comparison of the first and second differential pressures.

26. An apparatus for determining flow through a valve within a housing, the valve defining an upstream side and a downstream side, the apparatus comprising:

one or more pressure indicators configured to be collectively coupled to the downstream side and the upstream side of the valve;

a bypass configured to be coupled to the upstream side and to the downstream side of the valve; and a programmable device coupled to the one or more pressure indicators and to the bypass, the programmable device being programmed to perform the following operations:

determine a first differential pressure across the valve, bypass the valve after determining the first differential pressure, determine, after bypassing the valve, a second differential pressure across the valve, and determine a flow decision for the valve based on comparison of the first and second differential pressures.

27. An apparatus for determining flow through a valve, the apparatus comprising:

means for determining a first differential pressure across the valve;

means for bypassing the valve after determining the first differential pressure;

means for determining, after bypassing the valve, a second differential pressure across the valve; and means for producing a flow decision for the valve based on comparison of the first and second differential pressures, wherein determining the first differential pressure, bypassing the valve, determining the second differential pressure, and deterring the flow direction are performed in an automated fashion.

28. A method of testing a relief valve in a reduced pressure backflow preventer assembly including an upstream check valve, a downstream check valve, and the relief valve, the two check valves defining an upstream side of the assembly, a downstream side, and a zone between them, the relief valve and a vent to atmosphere being coupled to the zone, the method comprising:

determining, during a no flow condition, a first differential pressure across the upstream check valve;

bypassing the upstream check valve, after determining the first differential pressure, to allow flow between the upstream side of the assembly and the zone for the purpose of opening the relief valve; and opening the vent to reduce pressure in the zone.

29. The method of claim 28 wherein the method is performed in an automated fashion from a remote location.

30. The method of claim 28 further comprising determining that there is a no flow condition through the upstream check valve.

31. The method of claim 28 further comprising:

closing the vent; and determining a second differential pressure across the upstream check valve.

32. The method of claim 28 wherein the relief valve comprises the vent and is opened by a control signal.

33. A method of evaluating a valve, the method comprising:

determining a first differential pressure across a valve designed to substantially prevent flow in a direction;

bypassing the valve after determining the first differential pressure;

determining, after bypassing the valve, a second differential pressure across the valve;

comparing the first and second differential pressure; and providing a result based on the comparison of the first and second differential pressures, wherein determining the first differential pressure, bypassing the valve, determining the second differential pressure, comparing the first and second differential pressures, and providing the result are performed while an operational level of fluid flow can flow through the valve.

34. The method of claim 33 wherein determining the first differential pressure, bypassing the valve, determining the second differential pressure, comparing the first and second differential pressures, and providing the result are performed without human intervention.

35. The method of claim 34 further comprising repeating on a regular basis, and without human intervention, the determining of the first differential pressure, bypassing of the valve, determining of the second differential pressure, comparing of the first and second differential pressures, and providing of the result.

36. The method of claim 33 wherein providing a result comprises providing a flow decision for the valve based on comparison of the first and second differential pressures.

37. The method of claim 36 wherein the flow decision is a no-flow decision and the method further comprises testing the valve, or another valve in an assembly with the valve, after comparing the first and second differential pressures.

38. The method of claim 37 wherein testing the value, or another valve in an assembly with the valve, comprises testing an ability of the valve, or another valve in an assembly with the valve, to prevent flow in the direction.

* * * * *

UNITED STATES PATENT AND TRADEMARK OFFICE
CERTIFICATE OF CORRECTION

PATENT NO. : 6,675,110 B2
DATED : January 6, 2004
INVENTOR(S) : Lester Engelmann It is certified that error appears in the above-identified patent and that said Letters Patent is hereby corrected as shown below:

Column 8,
Line 17, after "can" replace "very" with -- vary --.

Column 13,
Line 3, replace "deterring" with -- determining --.

Column 15,
Line 8, replace "deterring the flow direction" with -- producing the flow decision --.

Column 16,
Line 5, replace "pressure" with -- pressures --.

Signed and Sealed this

Fourteenth Day of September, 2004

JON W. DUDAS
*Director of the United States Patent and Trademark Office*